Oct. 25, 1938.　　　H. HEYMANN　　　2,134,514
CONTROL SYSTEM
Filed March 23, 1936
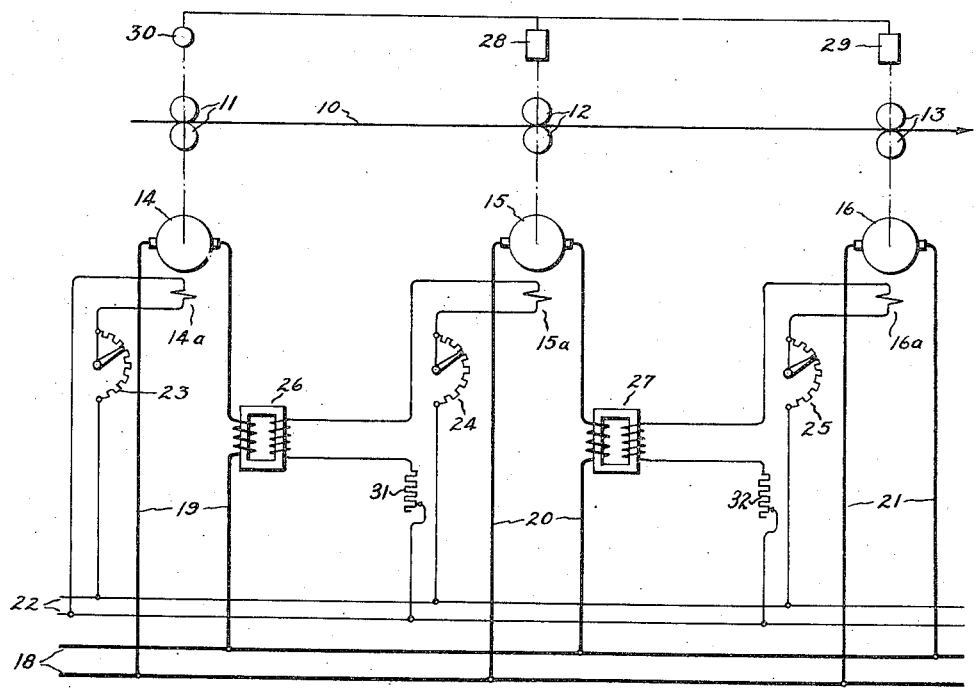
Inventor:
Hugo Heymann,
by Harry E. Dunham
His Attorney.

Patented Oct. 25, 1938

2,134,514

UNITED STATES PATENT OFFICE 2,134,514

CONTROL SYSTEM

Hugo Heymann, Berlin-Friedenau, Germany, assignor to General Electric Company, a corporation of New York Application March 23, 1936, Serial No. 70,506
In Germany April 4, 1935

4 Claims. (Cl. 172—239)

This invention relates to control systems, more particularly to systems for controlling the operation of a plurality of electric motors and it has for an object the provision of a simple, reliable and improved system of this character.

One aspect of this invention relates to a control system for a plurality of motors connected to drive the rolls at the successive stands of a continuous strip rolling mill, and a more specific object is the provision of means for controlling the speed of one of the motors in accordance with and solely in response to transients in the armature current of a preceding motor.

The separate stands of a variable speed continuous rolling mill are usually provided with individual drive motors because of the many advantages of this type of drive. For cold strip rolling, in which varying amounts of tension are permissible and useful, the correct speed ratio of the successive roll driving motors may be obtained simply by the use of properly compounded motors. In hot strip rolling, on the contrary, this method generally cannot be used because tension cannot be applied to a hot strip. This is especially true of very thin material, such for example as the strip from which wire or hoop iron is being rolled. Heretofore synchronous tie regulating devices have been utilized for maintaining the motors in predetermined speed relationship with each other.

In the case of rolling mills which operate at high speed, the time available for correcting the difference between the actual speed of a motor and the correct speed is generally insufficient after a disturbance to permit regulating devices of the type heretofore used to restore the correct speed ratio between the motors. For example, if the rolling speed is sixty feet per second and the successive stands are six feet apart, a variation in the speed ratio of two successive motors should be corrected in $\frac{1}{10}$th second in order to prevent sagging or stretching of the strip as the case may be.

In carrying the invention into effect in one form thereof, means are provided for producing an additional regulating effect on each motor solely in response to the transient armature current of the preceding motor. For a better and more complete understanding of the invention, reference should now be had to the following specification and to the accompanying drawing, the single figure of which is a diagrammatical illustration of an embodiment of the invention.

In illustrating the invention in one form thereof, it is shown as embodied in a control system for a plurality of direct current electric motors which are utilized to drive the rolls of a continuous strip mill.

Referring now to the drawing, a strip of material 10 such for example as hot steel is being rolled through the pairs of rolls 11, 12 and 13 of a continuous strip rolling mill. These pairs of rolls are respectively driven by electric motors 14, 15 and 16 through suitable driving connections. Motors 14, 15 and 16 are illustrated as separately excited direct current type motors supplied from a suitable source represented by supply lines 18 to which the armatures of the motors are respectively connected by means of conductors 19, 20 and 21. As shown, these motors are respectively provided with field windings $14_a$, $15_a$ and $16_a$ which are preferably supplied from a suitable separate source represented by the supply lines 22. Speed regulating resistances 23, 24 and 25 are included in the field circuits of these motors.

Each of the mill roll driving motors, except the motor driving the rolls of the last stand is provided with a transformer. Thus, motors 14 and 15 in the arrangement shown are provided with transformers 26 and 27 respectively, connected so that the primary winding of each transformer is traversed by the armature current of the associated motor. The secondary winding of transformer 26 is connected in circuit with the field winding of the following motor 15 and similarly the secondary winding of transformer 27 is connected in the field circuit of the motor 16 which drives the last stand.

Motors 15 and 16 are further provided with synchronous tie speed regulating devices 28 and 29 respectively, which are synchronized with motor 14 by means of a pilot generator 30. The devices 28 and 29 are of a well known type, such as used for controlling the speeds of the section driving motors of a sectionalized paper making machine and accordingly they are illustrated merely conventionally.

With the foregoing understanding of the apparatus and its organization, the operation will be readily understood from the following description:

It is assumed that the motors 14, 15 and 16 are energized and driving the rolls so that strip 10 will pass through the mill in the direction of the arrow. As the entering end of the strip enters between the rolls 11 of the first stand, the current of motor 14 will increase from no load value to some definite higher load value. The transient motor current, i. e. the change in the armature current of motor 14 induces a voltage in the secondary winding of transformer 26. This induced voltage is in the nature of an impulse and is supplied to the field circuit of motor 15 in such a direction as to strengthen the field of motor 15 and reduce the speed of the motor to a value such that the peripheral speed of rolls 12 is substantially equal to the linear speed of strip 10.

Similarly as the end of the strip enters rolls 12, the armature current of motor 15 increases from no load value to some higher load value, and this change in the armature current induces an impulse voltage in the secondary winding of transformer 27. Likewise, the induced voltage is supplied to the field circuit of motor 16, thereby reducing the speed of motor 16 and rolls 13 driven thereby. It should be noted that voltages are induced in the secondary windings of transformers 26 and 27 only when the armature currents of motors 14 and 15 are changing. As a result, the corrective regulation of each motor is produced solely by the transient in the armature current of the preceding motor and is active only during the transient. It should also be noted that any transient, however produced, in the armature current of a leading motor will produce a corrective action on the following motor so that the strip is prevented either from stretching or buckling.

The foregoing corrective action may be speeded up to any desired degree by the inclusion of ballast resistances 31, 32 in the field circuits of motors 15 and 16.

Although in accordance with the provisions of the patent statutes this invention is described as embodied in concrete form, it will be understood that the apparatus and connections shown and described are merely illustrative, and that the invention is not limited thereto since alterations and modifications will readily suggest themselves to persons skilled in the art without departing from the true spirit of this invention.

What I claim as new and desire to secure by Letters Patent of the United States is:

1. A control system comprising in combination a plurality of electric motors, and means responsive solely to transients in the armature current of one of said motors for controlling the operation of another of said motors.

2. A control system for a plurality of motors comprising means for controlling said motors to operate in predetermined speed relationship with each other and means responsive solely to transient operating conditions in the armature current of one of said motors for controlling the speed of another of said motors.

3. A motor control system comprising in combination a plurality of direct current motors, a source of supply for said motors and means responsive solely to transients in the armature current of one of said motors for controlling the excitation of another of said motors.

4. A motor control system comprising in combination a plurality of direct current motors each having a field winding, and means responsive only to transient operating conditions of one of said motors for controlling the excitation of another of said motors comprising a transformer having its primary winding connected in the armature circuit of said one motor and having its secondary winding connected in the field circuit of said other motor.

HUGO HEYMANN.